(No Model.) 2 Sheets—Sheet 1.
J. W. OSBORNE.
PULLEY, ROLLER, OR FRICTION WHEEL.
No. 289,367. Patented Nov. 27, 1883.
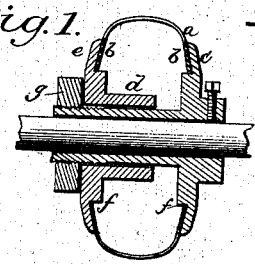 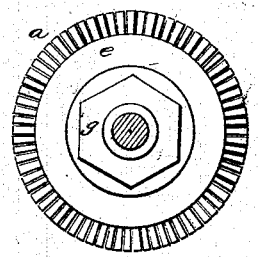 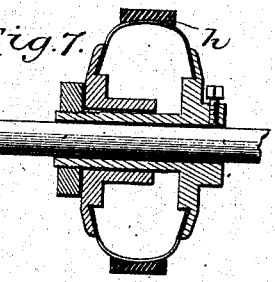
Fig. 1.   Fig. 2.   Fig. 7.
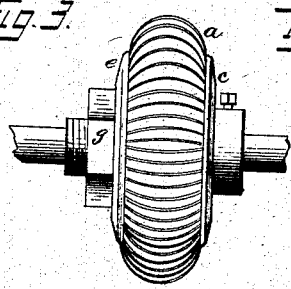 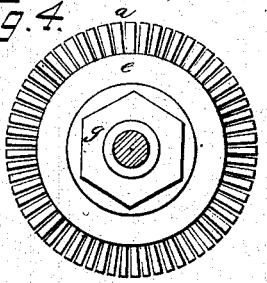 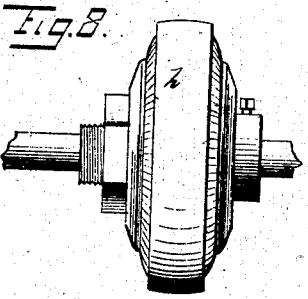
Fig. 3.   Fig. 4.   Fig. 8.
 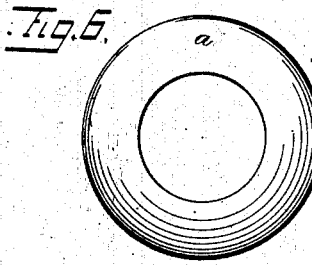 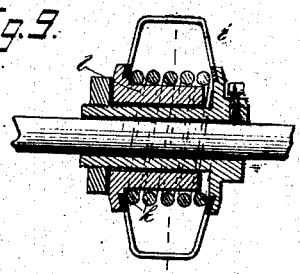
Fig. 5.   Fig. 6.   Fig. 9.
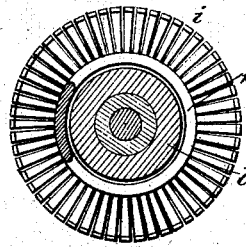 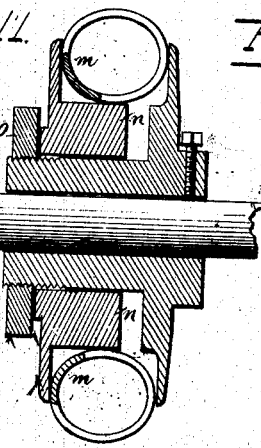 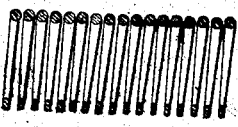
Fig. 10.   Fig. 11.   Fig. 12.
Witnesses:
H. C. McArthur,
Geo. F. Graham
Inventor.
John W. Osborne (No Model.) 2 Sheets—Sheet 2.
J. W. OSBORNE.
PULLEY, ROLLER, OR FRICTION WHEEL.
No. 289,367. Patented Nov. 27, 1883.
Fig.13. Fig.14.
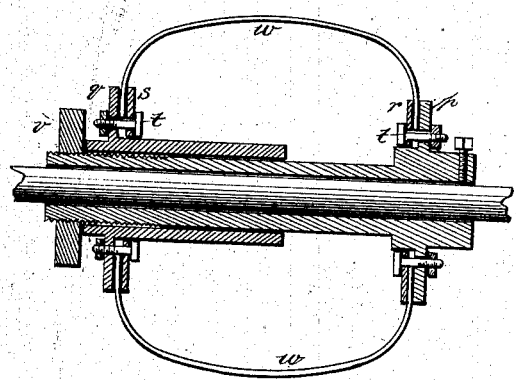
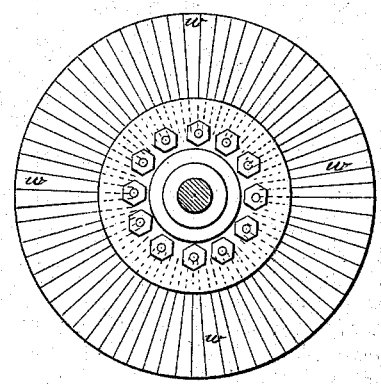
Fig.15.
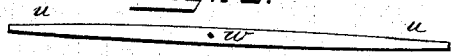
Fig.16. Fig.17.
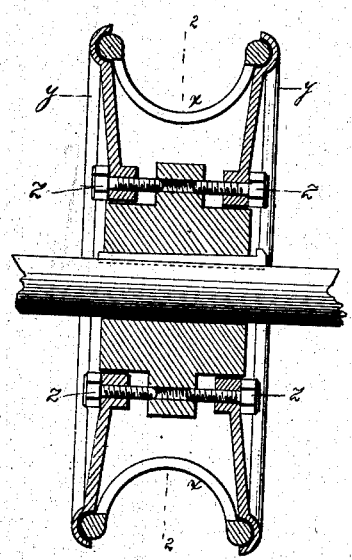
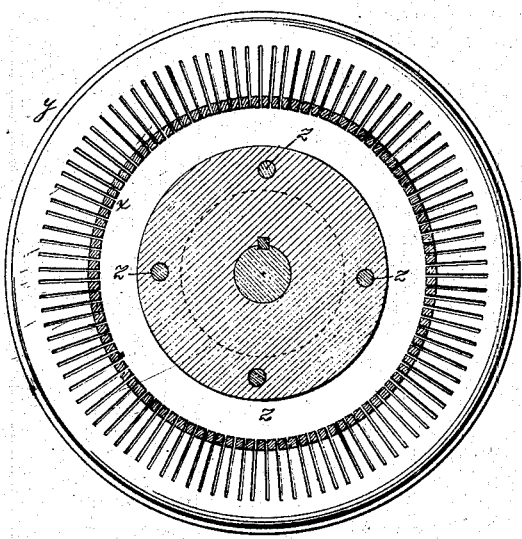
Witnesses.
H. C. McArthur
Geo. F. Graham
Inventor.
John W. Osborne

UNITED STATES PATENT OFFICE.

JOHN W. OSBORNE, OF WASHINGTON, DISTRICT OF COLUMBIA, ASSIGNOR TO WILLIAM H. FORBES, OF BOSTON, MASSACHUSETTS.

PULLEY, ROLLER, OR FRICTION-WHEEL.

SPECIFICATION forming part of Letters Patent No. 289,367, dated November 27, 1883.

Application filed October 3, 1881. (No model.)

*To all whom it may concern:*

Be it known that I, JOHN W. OSBORNE, of Washington, District of Columbia, have invented a new and useful Improvement in the Construction of Pulleys, Rollers, and Friction-Wheels, of which the following is a specification.

This invention is related, generally, to the devices employed for receiving and communicating motion by means of belts and bearing-surfaces generally, and specifically to the class of contrivances known as "expansible pulleys and wheels." As now constructed, for the most part, the diameter of such pulleys, rollers, &c., is made changeable within certain limits by moving segments of the periphery farther from or nearer to the shaft or axle on which the pulley or roller is fastened, or by adjusting conical surfaces on the same, so as to modify the position and radius of the driving portion; but when such methods are adopted it becomes a problem presenting many difficulties to keep the expanded or contracted periphery of the pulley or roller continuous, and at the same time practically circular. In my invention I sustain (concentrically with the axis of the pulley or wheel) a circular hollow shell of elastic material divided wholly or in part by radial saw-cuts or in other manner, placing the same between flanges or disks which can be mutually approached. By this arrangement lateral pressure can be applied to the sides of the divided shell, subject to which the same is forced to change its form in such a manner as to alter the diameter of the part of the pulley over which a belt travels, or which has frictional contact with some other bearing-surface.

In the drawings which form part of this specification, Figure 1 shows a pulley or roller in cross-section, in which the elastic expansible material is metal or hard rubber. Fig. 2 is a side elevation of the same. Fig. 3 represents the same pulley in front elevation after expansion. Fig. 4 is a side elevation of the same. Fig. 5 is a cross-section of the metallic shell alone which is used in the foregoing. Fig. 6 is a side elevation of the same before division into sectors. Fig. 7 is a cross-section of a pulley in which metal and vulcanized rubber are combined to furnish the elastic expansible material. Fig. 8 is a front elevation of the foregoing. Fig. 9 is the cross-section of a metallic expansible pulley of modified construction. Fig. 10 is a section of the same on line 1 1 of Fig. 9. Fig. 11 is the cross-section of an expansible pulley, showing a further modification. Fig. 12 shows in longitudinal section a portion of the expansible material used in the foregoing. Fig. 13 shows in cross-section a pulley having a large range of expansibility. Fig. 14 is a side elevation of the same with the compressing-nut removed. Fig. 15 shows in plan one sector of the expansible portion before bending. Fig. 16 is a cross-section of a pulley in which hard rubber is the elastic material used. Fig. 17 is a section of the same on line 2 2.

Figs. 1 to 6, inclusive, illustrate the construction of an expansible pulley based on the principles involved in my invention. In it an elastic metallic shell, $a$, is used, which, acted upon by lateral pressure, undergoes radial expansion. An annular shell of the description used is shown, independently of the rest of the pulley, in Figs. 5 and 6. It may be spun from brass, and its hardness and elasticity will be improved if it is afterward rolled with rolls adapted for the purpose. As shown in Fig. 5, the sides of the shell are conical for a short distance from their inner edges at $b\ b$, and these are connected by an elliptical or similar curve, which is to form the face of the pulley. The stock or body of the pulley has attached to it the flange $c$, and upon its cylindrical part slides the sleeve $d$, which carries a similar flange, $e$. The sides of both flanges are undercut in such a way as to be parallel to the conical part $b$ of the annular shell $a$, which is grasped by them, and the circular openings in the latter are accurately fitted to the cylindrical shoulder left for them at $f\ f$, Fig. 1. When such a shell of metal is caught, as shown, between the side flanges of the pulley, no pressure exerted by the nut $g$ will effect its expansion, because such a change would involve a stretching and elongation of its perimeter, which, under the circumstances, is impossible. I accomplish the end in view, however, by making a large number of fine saw-cuts radially through the shell and parallel to its axis, dividing its exposed curved surface only, in a manner made intelligible by the drawings, so that the working portion of the pulley-face shall consist of a number of arched springs extending from side to side, all united throughout the conical part $b\,b$ on both sides, where no expansion or extension takes place. In this arrangement, when pressure is applied by screwing up the nut $g$ the convexity of the face is increased, as seen in Fig. 3, and a dilation of each saw-cut takes place, which is greatest in the middle of the face, as seen in Fig. 4. To insure uniformity of the curve assumed by the exposed portion on both sides of the middle line upon the face, it is important that the conical part grasped by the flanges should remain immovable, as if held by the same. This is accomplished by giving to the sides of the shell so grasped the diverging conical form described, and fitting the circular openings in the same accurately upon the cylindrical shoulders $f\,f$. It will be readily understood that by this arrangement it is impossible for the sides of the shell, at their inner edges, to leave the flanges without meeting with resistance and wedging themselves tighter, and the result is that, the sides being solidly held, the movement of the elastic part is definite and the same at both sides.

This form of expansible pulley is well adapted to act as an adjustable roller in contact with reciprocating or rotating surfaces, and as a guide-roller, its adjustability giving it great advantages for these purposes. When used for belting, the belt should occupy only the central part of the face.

For certain purposes the shell for this pulley may be made of hard rubber, which will be found to work exceedingly well, being possessed of great and permanent elasticity. In that case, however, I construct the rubber shell very much thicker (relatively to the size of the pulley) than appears in the drawings, which are intended to represent brass.

In Figs. 7 and 8 a pulley is shown in which vulcanized rubber and metal are used conjointly. The main features of this modification are precisely like the preceding, the same general figure being used; but the metallic shell, after division, with the saw, is encircled by a thick band of rubber, $h$. This is tightly applied and holds its place with great tenacity, entering the saw-cuts to a slight extent. Its effect is to give strength to the divided shell by establishing continuity of structure between the separated curved springs; but it also performs the useful function of adding to their elasticity—that is, their power of recovering their original form when the pressure which has increased their convexity is removed. This rubber ring $h$ may also be made to give to a pulley of this construction a much flatter face when expanded than it would have without that addition. This is done by constructing the rubber ring so that its under surface corresponds in shape to that of the unexpanded shell, while its upper surface remains flat, or even in some cases concave. In the drawings the ring $h$ is shown flat, and the effects of expansion on it are seen in Fig. 11; but it obviously may be made V-shaped, so as to carry a round belt, should that be desirable.

A pulley constructed with the compound elastic ring, as here described, is well adapted to act as a roller in a variety of cases, as well as for carrying metallic and other belting, and it is especially adapted for working as a friction-wheel in variable positions against a smooth-face wheel for the transmission of great changes in speed. The rubber takes an excellent grip on such surfaces and wears slowly. When worn, it can be immediately renewed.

When a pulley is required with slight adjustability, but with a metallic face which is flat, or nearly so, at all times, I adopt a further modification of this principle. Such a pulley is shown in Figs. 9 and 10, both being sectional views. The form here given to the shell $i$ is such that the face, being flat, resists the lateral compressing force, and remains flat, or very nearly so, while the change in outline is confined almost solely to the sides; but the form of the shell here shown is unfavorable for giving it elastic strength, and to supplement that the spring $k$ is introduced. This is a very stiff spiral spring, which is under considerable tension, bearing outward at all times against the supported part of the shell. It fits loosely upon the sleeve $l$, and is easily got in place and retained there. This spring is preferably made of steel, and it may be used with any expansible pulley based upon the principle herein set forth, to supplement the elasticity of the elastic material interposed between the flanges.

When a metallic expansible pulley is required calculated to withstand hard usage without injury, I form the elastic material between the flanges of a spiral spring made of wire. A portion of such a spiral is shown in longitudinal section in Fig. 12. In Fig. 11 it is shown in cross-section and position at $m$, lapped round the sleeve $n$. This spiral may or may not be compressed, after winding, to the flattened elliptical shape seen in Fig. 11. By so doing the lateral force requisite for its expansion (applied by the nut $o$) must be greater; but the face remains flatter. Each turn of the spiral may also be filed away tapering toward its point of contact with the sleeve, as shown in Fig. 12, so that when grasped by the flanges all the convolutions of the spiral will be in contact before expansion; or the tapering may extend only as far as the edges of the flanges, the object being to hold the wire steadily without a possibility of shift. For a pulley so constructed steel wire may be used; but brass can be drawn so hard and stiff that in most cases it will prove sufficient. The distinctive advantage which this kind of pulley possesses is in the great strength and perfect elasticity of the wire, as compared with any other form which can be given to the metal employed.

In Figs. 13 and 14 an expansible pulley is represented which admits of great alteration in the diameter of its working-zone. The elastic part in this case is best constructed of spring-steel plates, punched out or otherwise cut from flat sheet-steel, all of the same size and form, which is easily determined. Fig. 15 shows in plan one such blade. The flanges $p$ and $q$ of the pulley have each of them a ring, $r$ and $s$, on their inner faces, which can be drawn up by the bolts $t\ t$. The extremities $u$ of the blades $w\ w$, &c., (the flanges $p$ and $q$ having been set at their nearest limit,) are then crowded in between the rings $r$ and $s$ and the flanges $p$ and $q$, respectively, the form of the extremities being such as to accurately fill the available space, after which the bolts $t\ t$, &c., are screwed up tight. When the compression-nut $v$ is now unscrewed, the elasticity of the blades $w\ w$, &c., will force the movable flange back, and the pulley will take its smallest diameter, as shown in Fig. 13. In this position the edges of the blades all lie close together; but they will separate more or less in the convex part, as the diameter is increased by screwing up the nut $v$. The thick rubber ring, as described and shown in Figs. 7 and 8, may be used with and made part of this pulley, as of all others in which a divided elastic shell forms the expansible periphery under the working-face.

Figs. 16 and 17 illustrate a pulley on the same principle as those already described, but differing from them in construction, so that the application of lateral pressure causes a decrease in its diameter, and the removal or lessening of that pressure an expansion. As shown, this pulley is designed to carry a round belt, and for it hard rubber may be conveniently used. The shell $x$ is divided by radial saw-cuts throughout the whole depth of the curved part, the round edge only remaining solid. This is caught in suitable recesses by the flanges $y\ y$, both of which slide upon the body of the pulley, moved by the bolts $z\ z$. The increase of pressure increases the convexity of the divided shell and lessens its diameter. By using a vulcanized rubber ring with this form of shell its bearing-surface can be fitted for a flat belt, which change can be also made by giving the shell originally a different form. The shell can of course be made of other material as well as hard rubber.

Having thus described my invention, what I claim, and desire to secure by Letters Patent, is—

1. An expansible pulley having its circumference composed of a series of springs of metal or equivalent rigid elastic material, said springs extending transversely to the place of rotation, substantially as described and shown.

2. A pulley or roller consisting of two parallel flanges, a number of bent springs extending from one flange to the other in a plane coinciding with the axis of the pulley, and means for increasing and decreasing the convexity of said springs, substantially as set forth.

3. In an expansible pulley, the combination, as described, of a divided expansible shell of hard elastic material with a continuous ring of vulcanized rubber encircling said shell.

4. In an expansible pulley, an elastic shell forming the circumference of the pulley and divided in the direction of the axis, in combination with a spiral spring, applied substantially as described, to supplement the elasticity of said shell.

5. In an expansible pulley, an elastic circumferential shell divided in the direction of the axis, and having conical sides $b\ b$, combined with compressing side flanges correspondingly undercut, and provided with shells $f\ f$, fitted to the openings in the shell, as described and shown.

JOHN W. OSBORNE.

Witnesses:
GEO. F. GRAHAM,
L. C. YOUNG.